United States Patent [19]

Yamasaki

[11] 4,453,811

[45] Jun. 12, 1984

[54] AUTOMATIC EXPOSURE CONTROLLER FOR A CAMERA

[75] Inventor: Masafumi Yamasaki, Hachioji, Japan

[73] Assignee: Olympus Optical Company Ltd., Japan

[21] Appl. No.: 366,581

[22] Filed: Apr. 8, 1982

[30] Foreign Application Priority Data

Jul. 7, 1981 [JP] Japan ................................ 56-105841

[51] Int. Cl.³ .............................................. G03B 7/08
[52] U.S. Cl. ...................................... 354/412; 354/425
[58] Field of Search ................................ 354/23 D, 31

[56] References Cited

U.S. PATENT DOCUMENTS 4,364,650 12/1982 Terashita et al. ..................... 354/31

Primary Examiner—Russell E. Adams
Attorney, Agent, or Firm—Ostrolenk, Faber, Gerb & Soffen

[57] ABSTRACT

An automatic exposure controller for camera permits a free selection between a spotwise photometry, an auto-mode and a manual photographing mode. When switching from the spotwise photometry mode to another photographing mode, photometric information which is stored during the spotwise photometry mode is cleared.

4 Claims, 6 Drawing Figures

AUTOMATIC EXPOSURE CONTROLLER FOR A CAMERA

BACKGROUND OF THE INVENTION

The invention relates to an automatic exposure controller for a camera, and more particularly, to such controller for use with a camera of the type which permits a free choice between a plurality of photographing modes, in at least one of which photometric information is stored in a memory circuit to enable a subsequent exposure control in accordance with the stored information.

In a conventional automatic exposure controller for a camera of the type in which photometric information is stored in a memory circuit for use in subsequent exposure control, the stored photometric information can be reset only by the provision of a devoted reset switch. However, the provision of a separate reset switch is undesirable in view of the recent trend toward a minimized size and weight and a simplified appearance.

In particular, in an arrangement in which photometric information is derived from spotwise photometry and is then stored, the intent of a photographer relating to a photographic composition can be reflected by the entry at a desired area within an image field of an object being photographed, the photometry of which has been made. Consequently, such photographing mode is adopted in photographic cameras of an advanced class. Such camera is generally capable of choosing one or more additional photographing modes. For example a mode changeover switch will be provided to permit a choice between a photographing mode utilizing a stored spotwise photometry and another photographing mode of an average photometry type which does not utilize stored information. For the reason mentioned previously, a provision of a separate reset switch in such a camera is undesirable.

SUMMARY OF THE INVENTION

It is an object of the invention to provide an automatic exposure controller for a camera which is capable of performing a plurality of photographing modes wherein one of the modes provides an exposure control in response to photometric information which is stored and wherein the storage of the photometric information is reset as the photographing mode is changed to another mode.

In accordance with the invention, a mere switching from a photographing mode in which photometric information is stored in accordance with the intent of a photographer to another photographing mode is all that is required to reset the stored information, thus dispensing with any devoted reset switch. In this manner, the entire camera system is simplified, advantageously providing a reduced size and weight.

DESCRIPTION OF PREFERRED EMBODIMENT

Figure 1:
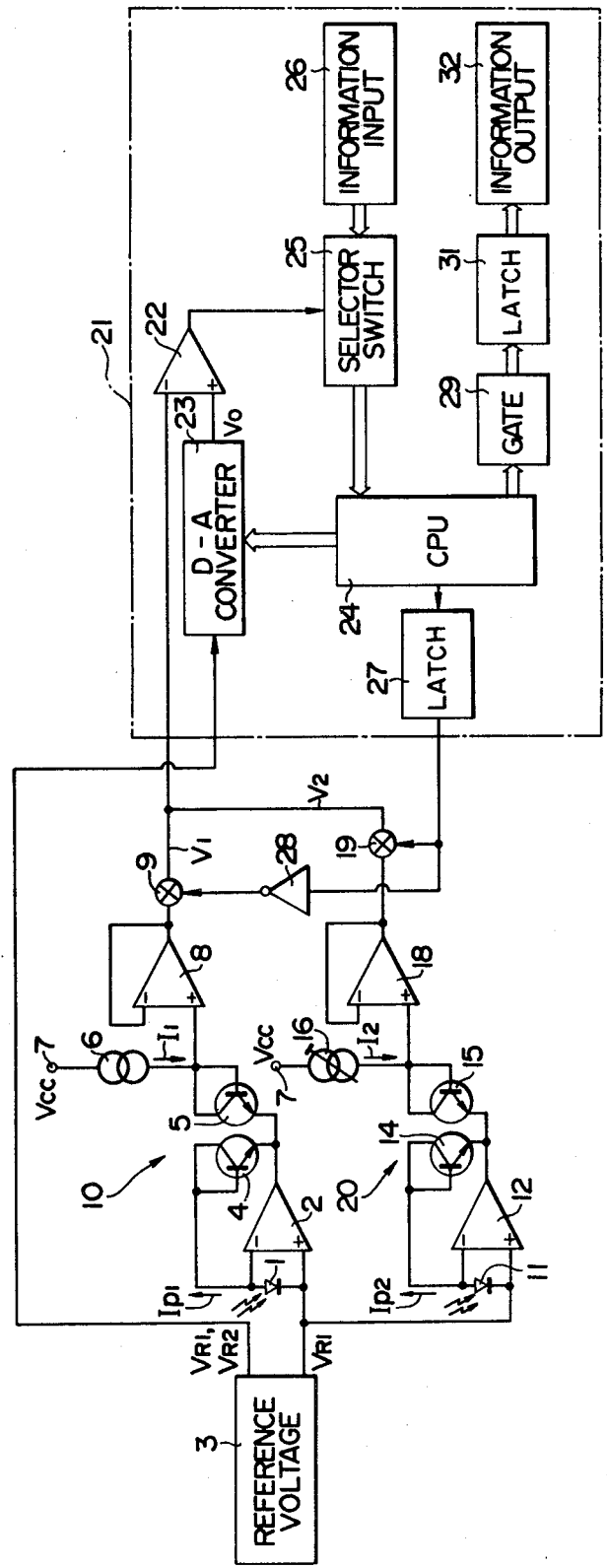
FIG. 1 is a circuit diagram, partly in block form, of an automatic exposure controller according to one embodiment of the invention.

Referring to FIG. 1, there is shown an electrical circuit diagram of an automatic exposure controller for a camera according to one embodiment of the invention. As shown, there is provided a light receiving element 1 which is disposed for average photometry, namely, disposed so as to receive light from a relatively large area or substantially entire image field after the light has been reflected by a first shutter blind or film surface of a single lens reflex camera. The anode of the element 1 is connected to an inverting input terminal of an operational amplifier 2 while its cathode is connected to its non-inverting input terminal. The non-inverting input terminal is also connected to a terminal of a reference voltage circuit 3 at which a reference voltage VR1 is developed. The inverting input terminal of the amplifier 2 is connected to the base and collector of an NPN transistor 4 in common, and the emitter of the transistor is connected to the output terminal of the amplifier 2. The common connection of the base and collector of the transistor 4 which is connected between the inverting input terminal and the output terminal of the amplifier 2 allows the transistor 4 to function as a logarithmic compression diode which converts a photocurrent Ip1 produced by the element 1 into a voltage having a corresponding logarithmic value. The output terminal of the amplifier 2 is also connected to the emitter of an NPN transistor 5, the base and collector of which are connected in common and connected through a constant current source 6 to a terminal 7, to which a supply voltage Vcc is applied. This configuration of connection of the transistor 5, which is connected across the output terminal of the amplifier 2 and the source 6 which supplies a constant current flow $I_1$, allows it to function as a diode which cancels an inverse saturation current of the transistor 4. Accordingly, there is developed a voltage at the base and collector of the transistor 5 which is proportional to the logarithmic conversion of the photocurrent Ip1 from the element 1 and the absolute temperature. The base and collector of the transistor 5 is connected to the non-inverting input terminal of an operational amplifier 8 functioning as an impedance converter and forming a voltage follower having a high input impedance. The inverting input terminal of the amplifier 8 is connected to its output terminal, which is in turn connected through an analog switch 9 to one input of a comparator 22 contained in information processing circuit 21, which is indicated by phantom lines.

The described arrangement comprises an average photometry circuit 10. In substantially the same manner, a spotwise photometry circuit 20 is provided. Specifically, the spotwise photometry circuit 20 comprises a light receiving element 11 disposed for spotwise photometry, an operational amplifier 12, an NPN transistor 14 which is configured to provide a logarithmic compression, an NPN transistor 15 which cancels an inverse saturation current, a constant current source 16, an operational amplifier 18 which serves an impedance conversion, and an analog switch 19. It will be seen that the circuit connection is quite the same as the connection of corresponding parts shown and described above in connection with the average photometry circuit 10. The distinction of the spotwise photometry circuit 20 over the average photometry circuit 10 is the fact that the element 11 is disposed to receive light from an object being photographed over a relatively small area, namely, essentially the central region of an image field in a spotwise manner and that the source 16 is capable of changing the magnitude of the constant current $I_2$, which allows an adjustment of an output level from the spotwise photometry to match an output level from the average photometry. The output terminal of the amplifier 18 is connected through the analog switch 19 to the one input terminal of the comparator 22 in the information processing circuit 21.

Considering the information processing circuit 21, the other input terminal of the comparator 22 is connected to a D/A converter 23 which forms together with the comparator 22 and a central processing unit 24 an A/D converter of sequential comparison type which converts an analog voltage corresponding to the brightness of an object being photographed, determined during the average or the spotwise photometry, into a corresponding digital value. Specifically, the comparator 22 compares an analog value representing an outut voltage $V_1$ from the average photometry or an output voltage $V_2$ from the spotwise photometry which corresponds to the brightness of an object being photographed against an output voltage $V_0$ from the D/A converter 23 to provide an high level or binary "1" for $V_1$ (or $V_2$) > $V_0$ and provides a low level or binary "0" for $V_1$(or $V_2$) < $V_0$. The output terminal of the comparator 22 is connected to a selection switch 25 which selects one of a plurality of different photographing information such as film speed or diaphragm aperture, information indicating an automatic photographing mode in which an average photometry is relied upon to determine an exposure period automatically or indicating a spotwise photometry photographing mode, all supplied from information input circuit 26, in response to an address signal supplied from CPU 24. In this manner, an output from the comparator 22 is supplied to CPU 24 together with information input from the information input circuit 26 through the selection switch 25 in response to an instruction from CPU 24. CPU 24 performs a variety of local and arithmetic operations, decisions and control of storage. For example, it causes the conversion of an analog voltage representing the brightness of an object being photographed into a corresponding digital value for storage, or calculates a shutter speed or a diaphragm aperture which is required to achieve a proper exposure, thus functioning as a central control over the entire camera system. An output from CPU 24 is introduced into the converter 23 for conversion into a corresponding analog value. It is to be noted that reference voltages VR1, VR2 (VR1 < VR2) developed by the reference voltage circuit 3 are applied to the converter 23. Also, CPU 24 feeds a signal to a latch circuit 27, the output terminal of which is directly connected to the control terminal of the analog switch 19 and is also connected through an inverter 28 to the control terminal of the analog switch 9. The analog switches 9, 19 are rendered conductive when a high level is applied to their control terminals, and are rendered non-conductive when a low level is applied thereto. In this manner, depending on an output level from the latch circuit 27, either one of the analog switches 9, 19 is conductive while the other is non-conductive in alternate fashion. When the analog switch 9 is conductive, an output from the average photometry is introduced into the comparator 22. CPU 24 also produces an output which is fed through a gate circuit 29 and a latch circuit 31 to activate information output circuit 32. The gate circuit 28 is enabled to operate the latch circuit 31 in order to output various information such as shutter speed or diaphragm aperture by means of the information output circuit 32. Gates of the circuit 29 other than that selected by CPU 24 remain normally closed. The purpose of the latch circuit 31 is to hold a signal delivered to the information output circuit 32 until it is updated.

Figure 2:
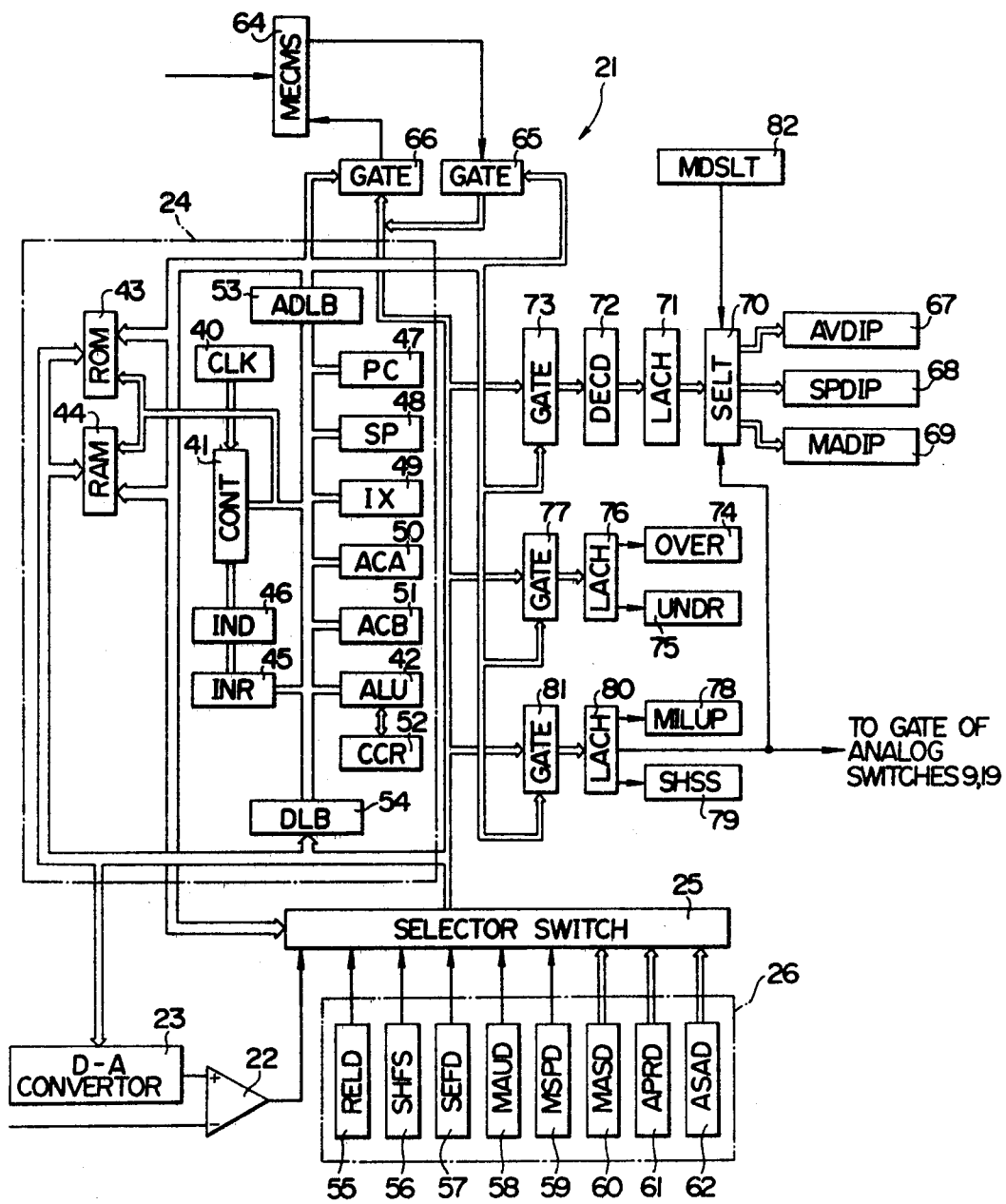
FIG. 2 is a block diagram of an information processing circuit used in the arrangement of FIG. 1.

FIG. 2 shows a specific arrangement of the information processing circuit 21. In general use, the term "CPU" is considered as including a memory, and hence CPU 24 is constructed herein as including such memory. CLK 40 represents a clock generator producing pulses which provide a timing signals for the operation of the entire circuit. An output of the clock generator is fed to a control circuit CONT 41, which produces a variety of control signals delivered to an arithmetic and processing circuit ALU 42, a read-only memory ROM 43, a random access memory RAM 44 and other circuits for operation thereof. For example, when a control signal from CONT 41 is fed to ROM 43, and instruction is taken out of the latter, and the various static functional circuits of ALU 42 operate in accordance with a control sequence which is signified by each instruction code, thus controlling the execution of the instruction. An instruction register INR 45 temporarily stores an output from ROM 43, and an instruction decoder IND 46 supplies a control signal to CONT 41 in accordance with the content of an instruction stored in INR 45. A program counter PC 47 stores an address of an instruction to be executed in order to assure the execution of a program in a proper sequence. It is to be noted that the content in PC 47 is incremented by one from the lowest to the highest address in the sequence of instructions to be executed. A stack pointer SP 48 temporarily stores the content of PC 47, an index register IX 49, an A accumulator ACA 50 and another accumulator B or ACB 51 without destructing the content in the event of occurrence of an interrupt or a transfer instruction to a subroutine in the course of executing an instruction, thereby enabling the re-use of such content. IX 49 stores an address of an instruction in an arrangement in which the instructions are executed on an index address basis. ALU 42 includes an adder, a shift circuit and registers so that arithmetic and logical operations performed on data and a data transfer can be made. ACA 50 and ACB 51 are central registers used in the data processing. For example, when executing an instruction "X+Y=S", "X" is entered into ACA 50 initially, followed by the addition of "Y" to the content of ACA 50. Subsequently, the sum is loaded into ACA 50, whereby the sum "S" is loaded in the ACA 50. A condition code register CCR 52 stores the result of an arithmetic operation. CCR 52 includes flags including a flag for controlling the interrupt function and other flags controlling conditional branches which may be required as a result of arithmetic operations in the event a carry or borrow is produced, whether or not the result is equal to zero or if an overflow has occurred. CPU 24 executes the instructions on the basis of a determination rendered concerning the condition of CCR 52. The read-only memory ROM 43 stores data representing the content of instructions, which are sequentially read out by PC 47 for execution of the instructions. The random access memory RAM 44 temporarily stores data which is used in the course of an arithmetic operation as well as a variety of other input and output information. An address latch and buffer ADLB 53 temporarily stores an address signal fed from the interior of CPU 24 after its conversion into an electrical signal of a magnitude which is required to drive ROM 43, RAM 44 and selection switch 25. A data latch and buffer DLB 54 temporarily stores data signal fed from the interior of CPU 25 after its conversion into an electrical signal of a magnitude which is required to drive ROM 43, RAM 44, etc.

The information input circuit 26 includes a release signal detection switch RELD 55, a first shutter blind running detection switch SHFS 56, a self-mode detection switch SEFD 57, an auto-mode detection switch MAUD 58, a spotwise mode detection switch MSPD 59, a manual code inputting device MASD 60, a diaphragm information inputting device APRD 61, and a film speed information inputting device ASAD 62. Thus, the selection switch 25 provides a selection among an output from the comparator 22, information from various detection switches and particular input information from the input devices of the information input circuit 26, in accordance with an address signal fed from CPU 24. In this manner, an address code fed from CPU 24 has a one-to-one correspondence with one of a variety of input information.

A spotwise photometry signal inputting device MECMS 64 receives a spotwise photometry signal supplied from a photographer before a shutter release, thus enabling the storage of spotwise photometry information. A gate circuit GATE 65 is provided to detect the internal condition of MECMS 64, while a gate circuit GATE 66 is provided to supply a signal which resets the internal condition of MECMS 64 after CPU 24 has supplied the spotwise photometry signal thereto.

The arrangement further includes an average photometry display AVDIP 67, a spotwise photometry display SPDIP 68 and a manual display MADIP 69. Another selection switch SELT 70 is provided for selecting one of display data supplied from CPU 24 for application to one of the displays 67 to 69. A latch circuit LACH 71 maintains the data to be displayed until it is updated. A decoder DECD 72 converts data to be displayed which is supplied from CPU 24 into a signal form which is suitable for display. Data to be displayed is passed through a gate circuit GATE 73 before it is supplied from CPU 24 to one of the displays 67 to 69. There are also provided an over-exposure indicator OVER 74 and an under-exposure indicator UNDR 75, each of which is associated with a latch circuit LACH 76 which temporarily stores such data. Data from CPU 24 is passed through a gate circuit GATE 77 before it is fed through LACH 76 to either indicator 74 or 75. The arrangement further includes a mirror up-drive circuit MILUP 78 which causes a mirror to move upward in response to a mirror up signal fed from CPU 24, and a second shutter blind starting drive circuit SHSS 79 which allows a second shutter blind to begin running in response to a second shutter blind start signal fed from CPU 24. These signals are temporarily stored by a latch circuit LACH 80 after the signal has been passed through a gate circuit GATE 81. It is to be understood that the gate circuits GATE 65, 66, 73, 77 and 81 are included in the gate circuit 29 mentioned previously while the latch circuits LACH 71, 76 and 80 are included in the latch circuit 31. Similarly, the displays 67, 68 and 69 and the indicators 74, 75 as well as the drive circuit 78, 79 are included in the information output circuit 32. It is also to be noted that the latch circuit LACH 80 also serves as the latch circuit 27 which supplies a control signal to the control terminals of the analog switches 9, 19. The output of LACH 80 is also fed to SELT 70 since it is necessary when an average photometry is established through the control of the analog switches 9, 19 by the output from the latch circuit LACH 80 or 27 that an indication of the average photometry be provided at the same time as a corresponding arithmetic operation is being made. A mode selection switch MDSLT 82 allows a selection among an auto-mode, a spotwise mode or manual mode. It is to be noted that the switch MDSLT 82 is ganged with the detection switches MAUD 58 and MSPD 59 in the information input circuit 26.

Figure 3:
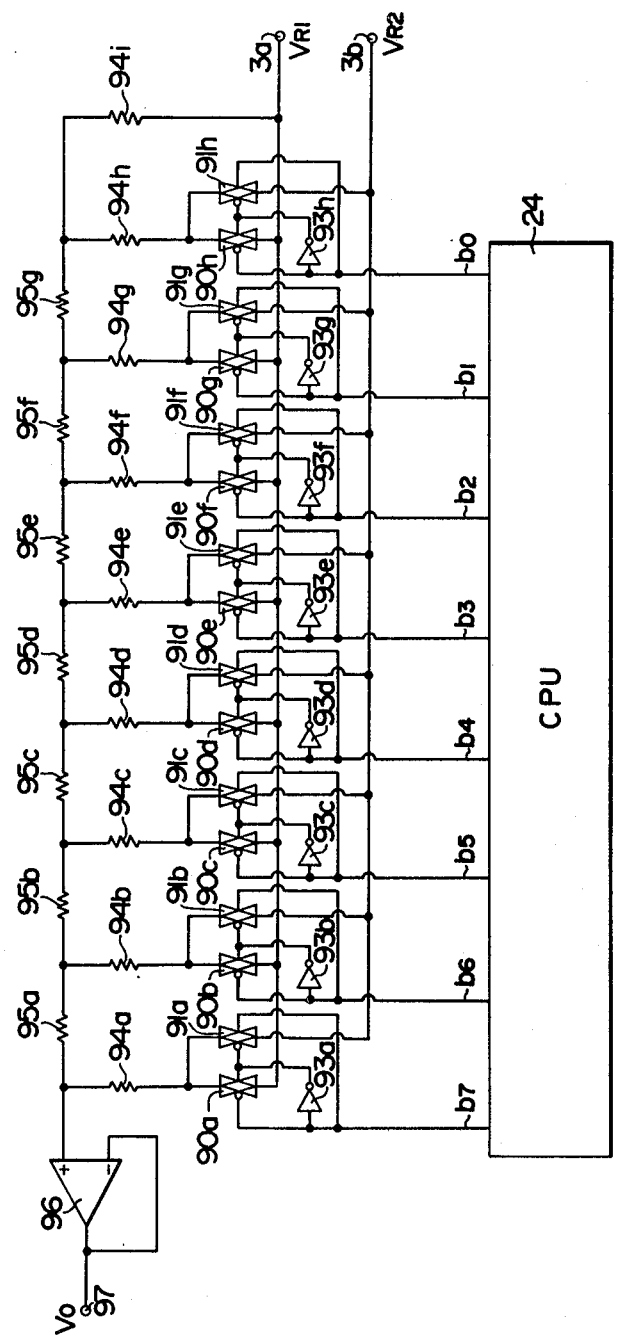
FIG. 3 is a circuit diagram of a D/A converter shown in FIG. 1.

FIG. 3 shows an exemplary circuit arrangement of the D/A converter 23 which forms an A/D converter of sequential comparison type together with the comparator 22 and CPU 24. The D/A converter 23 is of an 8-bit ladder type, and includes sixteen changeover switches $90a$–$90h$, $91a$–$91h$, each of which is an analog switch formed by CMOS switch. One end of each of the changeover switches $90a$–$90h$ is connected to a terminal $3a$ of the reference voltage circuit 3 where the reference voltage VR1 is developed, and one end of each of the changeover switches $91a$–$91h$ is connected to a terminal $3b$ of the circuit 3 where the reference voltage VR2 is developed. Each of the changeover switches $90a$–$90h$ includes a control terminal, to which a respective bit signal $b_7$–$b_0$ is applied from CPU 24. Each of the changeover switches $91a$–$91h$ also includes a control terminal, to which an inversion of respective bit signals $b_7$–$b_0$ is applied through an associated one of inversion $93a$–$93h$. The other end of the changeover switches $90a$–$90h$ is connected with the other end of the corresponding changeover switches $91a$–$91h$, with the junction therebetween being connected to one end of resistors $94a$–$94h$, respectively. The other end of the resistors $94a$–$94h$ is successively connected to one end, successive junctions between, and the other end of a bank of resistors $95a$–$95g$ which are connected in series with each other. The junction between the resistors $94a$, $95a$ is connected to the noninverting input terminal of an operational amplifier 96 which forms a voltage follower. The junction between the resistors $94h$, $95g$ is connected through a resistor $94i$ to the terminal $3a$ where the reference voltage VR1 is applied. The inverting input terminal and the output terminal of the amplifier 96 are connected in common and connected to an output terminal 97 of the D/A converter 23. Each of the resistors $95a$–$95g$ has a resistance of R, each of the resistors $94a$–$94i$ has a resistance of 2R, and the reference voltages VR1, VR2 are related such that VR2>VR1. When each bit signal $b_7$–$b_0$ from CPU 24 assumes an "H" level, the corresponding changeover switch $90a$–$90h$ is closed to apply the reference voltage VR1 to one end of the corresponding resistors $94a$–$94h$. Conversely, when each bit signal $b_7$–$b_0$ assumes an "L" level, the corresponding changeover switch $91a$–$91h$ is closed to apply the reference voltage VR2 to one end of the corresponding resistor $94a$–$94h$. In this manner, depending on the values of the respective bit signals $b_7$–$b_0$, the D/A converter 23 produces an output voltage $V_0$ which is expressed as follows:

$$V_O = VR1 + \frac{VR2 - VR1}{2}(b_7 2^0 + b_6 2^{-1} + b_5 2^{-2} + b_4 2^{-3} + b_3 2^{-4} + b_2 2^{-5} + b_1 2^{-6} + b_0 2^{-7}) \quad (1)$$

Here, the bit signals $b_7$–$b_0$ assume a value of 1 when in its "H" level, and assumes a value of 0 when in its "L" level.

The operation of the automatic exposure controller described above will now be described with reference to FIGS. 4 to 6. When a power switch, not shown, is turned on, all the electrical circuits are powered, and the various circuit components within the information processing circuit 21 are initialized or reset to their initial conditions. PC 47 sequentially reads out an instruction from ROM 43 for execution thereof.

Figure 4:
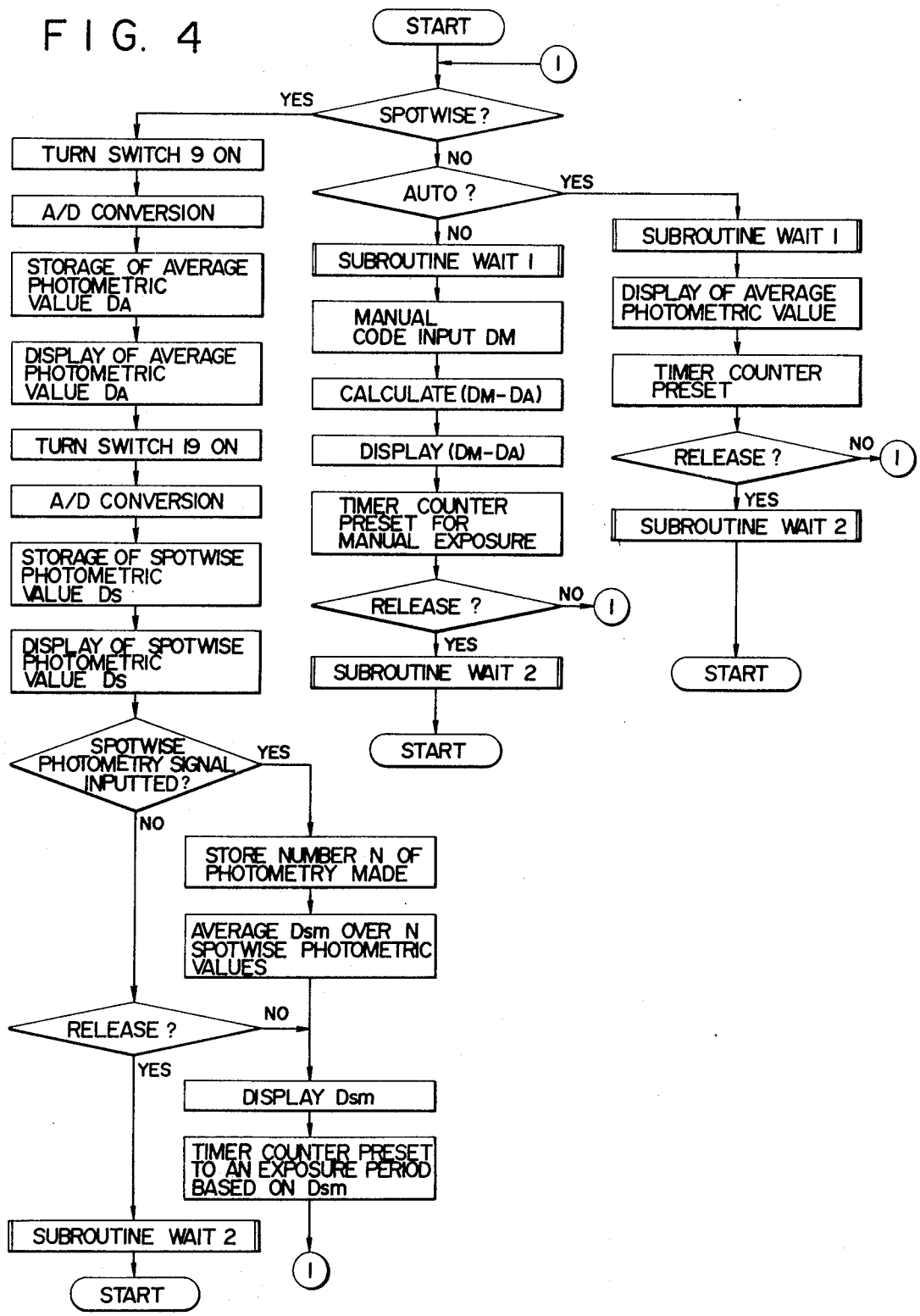
FIG. 4 is a flowchart of a control program performed by the automatic exposure controller of FIG. 1.
Figure 5:
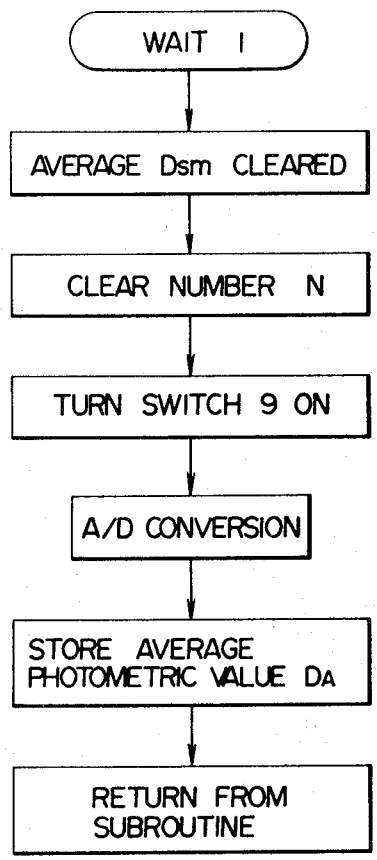
FIGS. 5 and 6 are flowcharts of certain subroutines shown in FIG. 4.

When the execution of the program shown in FIG. 4 starts, the photographing mode to be used is initially determined. If MDSLT 82 has selected a spotwise mode and MSPD 59 in the information input circuit 26 is operated, the selection switch 25 has selected the detection of the spotwise mode, whereby GATE 81 is opened to allow LACH 80 (latch circuit 27) to feed a signal which controls the analog switches 9, 19. At this time, the output from LACH 80 (latch circuit 27) initially assumes a low level, whereby the analog switch 9 is turned on to introduce an output from the average photometry circuit into the comparator 22 of the information processing circuit 21. Assuming that the element 1 which is used for average photometry produces a photocurrent of Ip1 and the source 6 provides a collector current of $I_1$ for the transistor 5, the collector potential $V_1$ of the transistor 5 is expressed as follows:

$$V_1 = VR1 + kT/q \ln (I_1/Ip1)$$

where k represents Boltzmann's constant, q the charge of an electron and T the absolute temperature. The voltage $V_1$ is fed through the amplifier 8 and analog switch 9 to be applied to the inverting input terminal of the comparators 2 as an average photometric output. The voltage $V_1$ in the form of an analog voltage corresponding to the brightness of an object being photographed, when applied to the inverting input terminal of the comparator 22, causes the A/D converter comprising the comparator 22, the D/A converter 23 and CPU 24 to produce a corresponding digital value, which is developed at the output of the comparator 22. The detailed description of operation of the analog-to-digital conversion will not be given here. The average photometric value DA in digital form is stored within RAM 44 of CPU 24 at a specified address. The average photometric value DA is fed through GATE 73 to AVDIP 67, which displays it. The output from LACH 80 (latch circuit 27) then inverts to a high level, whereby the analog switch 19 is turned on to permit an output from the spotwise photometry circuit to be introduced into the information processing circuit 21. Assuming the element 11 which is used for spotwise photometry produces a photocurrent of Ip2 and the source 16 provides a collector current of $I_2$ for the transistor 15, the collector potential of the transistor, or an output voltage $V_2$ which is applied to the inverting input terminal of the comparator 22 through the analog switch 19, can be represented as follows:

$$V_2 = VR1 + kT/q \ln (I_2/Ip2)$$

The voltage $V_2$ in analog form is converted into a corresponding digital value by the A/D converter comprising the comparator 22, D/A converter 23 and CPU 24. The spotwise photometric value Ds in digital form is stored in RAM 44 at a specified address. The spotwise photometric value Ds is also fed through GATE 73 to AVDIP 67, which displays it. Thus, AVDIP 67 displays both the average photometric value DA and the spotwise photometric value Ds to permit a photographer to perform a photometric operation while observing the displayed values DA, Ds. At this point in time, if a photographer desires to take a picture on the basis of spotwise photometry over a plurality of spots, he directs the camera toward the object being determined, each time operating an external member. In response to the operation of the external member, a signal is fed to MECMS 64 and GATE 65 is enabled, whereby CPU 24 detects that the spotwise photometry signal has been fed to MECMS 64. CPU 24 stores the number of times N the spotwise photometry signal has been inputted, and then calculated an average value of spotwise photometry Dsm over N spots, by dividing the sum of N spotwise photometric values by the number N. The average value Dsm is fed through GATE 73 to SPDIP 68, which displays it. An exposure period which is based on the average value Dsm is preset in a timer counter. This exposure period is determined by decrementing the timer counter with a reference pulse until it reaches a given value. Subsequently, while the external member is not operated and no spotwise photometry signal is applied to MECMS 64, CPU 24 detects this fact, and then determines if a release signal is applied thereto. If RELD 55 has not been operated to produce a release signal, the average value Dsm from the spotwise photometry is displayed by SPDIP 68, followed by establishing an exposure period which is based on such average value Dsm in the timer counter. If RELD 55 has been operated to produce a release signal, the program transfers to a subroutine WAIT 2.

Figure 6:
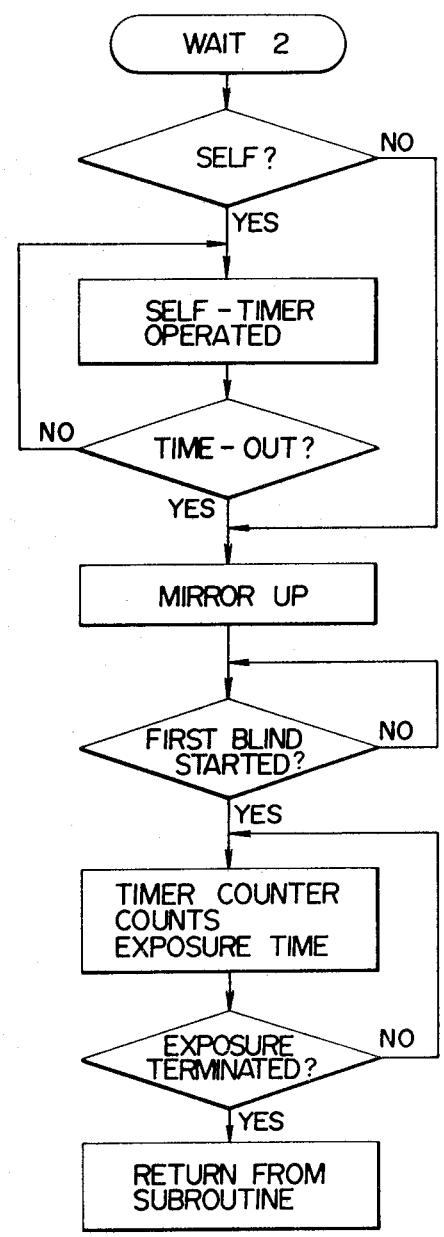

When the program goes to the subroutine WAIT 2, a detection is made whether or not a self-timer is selected, as shown in FIG. 6. If the self-timer is selected, the self-timer is actuated. Upon termination of the operation of the self-timer, CPU 24 then supplies a signal through GATE 81 to MILUP 78, thus causing the mirror to move upward. If the self-timer is not selected, its detection is followed by an immediate upward movement of the mirror. Subsequently, the condition of SHFS 56 is detected, utilizing the selection switch 25, and if the first shutter blind has started, a time counting operation by the counter which counts up an exposure period is initiated. When the counter times out, a signal is fed through GATE 81 to SHSS 79 to initiate the running of the second shutter blind, thus terminating an exposure. The subroutine is then terminated, returning to the start position of the program shown in FIG. 4.

The above description covers the execution of an exposure controlling program during the spotwise photometry. An average photometric value DA is displayed by AVDIP 67 during the spotwise mode, and SPDIP 68 displays both the spotwise photometric value Ds and spotwise photometry average value Dsm. GATE 73 connected to the input side of these displays are supplied with the described three kinds of photometric data in time sharing scheme. Since the execution of the program proceeds very rapidly, it appears that the display of these three photometric values takes place simultaneously and continuously.

Returning to FIG. 4, after the start of the execution of the program, if it is determined at the branch point which determines the photographing mode that the spotwise photometry mode is not selected, it is then determined whether or not the auto-mode is selected. If the auto-mode is selected by a selection of this mode by MDSLT 82 and the operation of MAUD 58, the program transfers to a subroutine WAIT 1. As shown in FIG. 5, in the subroutine WAIT 1, the average value Dsm of the spotwise photometry as well as the number of times N the spotwise photometry has been repeated are cleared. This means that photometric information obtained during the spotwise photometry is entirely reset by a switching from the spotwise mode to the auto-mode upon selecting the auto-mode by means of MDSLT 82, as when it is desired to repeat the photometry by resetting photometric information even though MDSLT 82 initially selected the spotwise mode, followed by inputting the desired photometric information into MECMS 64. Subsequently, the analog switch 9 is turned on, whereby the output from the average photometry circuit is fed to the comparator 22, and the output voltage $V_1$ from the average photometry is subject to analog-to-digital conversion. When the average value DA in digital form is stored in CPU 24, the program returns from the subroutine WAIT 1 to display the average value DA by means of AUDIP 67. After such display, a timer counter which determines the exposure period is established on the basis of the average photometric value DA. The selection switch 25 then allows the condition of RELD 55 to be detected, and if no release is made, the program returns to a point where the photographing mode is determined again. If a release has been made, the program transfers to the subroutine WAIT 2 shown in FIG. 6, which is constructed as mentioned previously. When returning from the subroutine WAIT 2, the program returns to the start position.

After starting the execution of the program, if it is determined at the branch point where the photographing mode is determined that neither spotwise mode nor auto-mode is selected, it follows that MDSLT 82 and MASD 60 have selected the manual mode. When the selection of the manual mode is detected through the selection switch 25, the program transfers to the subroutine WAIT 1 shown in FIG. 5 in the similar manner as occurs in the auto-mode mentioned above. Specifically, when the manual mode is selected, both the average value Dsm and the number of times N of the spotwise photometry are cleared as before. Specifically, when it is desired to repeat the photometry after the spotwise photometry mode has been selected to input desired photometric information into MECMS 64, there takes place a switching from the spotwise mode to a photographing mode other than that, namely, to either auto-mode or manual mode, and this clears photometric information resulting from the spotwise photometry. When returning from the subroutine WAIT 1, MASD 60 inputs a manual period code DM. A difference (DM−DA) between the manual period code DM and the average value DA which has been calculated in the subroutine WAIT 1 is determined, and the difference is displayed by MADIP 69. Subsequently, a manual exposure period which is based on the difference (DM−DA) is established in the timer counter. The condition of RELD 55 is then detected, and if no release is made, the program returns to the point where the photograhing mode is determined after the start of the program. If a release has been made, the program transfers to the subroutine WAIT 2 shown in FIG. 6. When the subroutine WAIT 2 has been executed to terminate an exposure, the program returns to the start position.

As discussed above, in the automatic exposure controller described above, the outputs from the average photometry and the spotwise photometry are introduced into the information processing circuit 21 wherein an analog-to-digital conversion is made. In accordance with various information inputs, CPU 24 performs arithmetic operations and storage of data. It will be noted that the automatic exposure controller has a plurality of photograhing modes. A spotwise photometry over a plurality of spots may be made, and the resulting output may be stored to determine an average value which is used to control the exposure. Alternatively, an automatic photographing mode which is based on the average photometric value or a manual photographing mode may be used in which the exposure control is performed in a fully automatic manner. As when the spotwise photometry over a plurality of spots is selected, where the photometric value is stored in accordance with the intent of a photographer with respect to a photographic composition, it is possible that the composition be changed in the course of the photometry. In such instance, the photometric information must be changed, and hence it is necessary to reset the spotwise photometric value which has once been stored. In such instance, switching MDSLT 82 to a photographing mode other than the spotwise photometry mode resets entire photometric information which results from the spotwise photometry, as mentioned above in connection with flowcharts, at the initiation of executing a program in the automatic or manual photographing mode. Accordingly, if it is desired to continue the spotwise photometry after the photometric information has once been reset, MDSLT 82 may be again switched to the spot photometry mode, whereupon MSPD 59 detects an output from the spotwise photometry to permit the execution of a program in the spotwise photometry.

What is claimed is:

1. An automatic exposure controller for camera, comprising:
    an A/D converter for converting an output from a photometry circuit into a corresponding digital value;
    a mode selection switch for selecting one of a plurality of photographing modes; and
    a central processing unit having the capability of storing an output from the A/D converter during a first photographing mode, the central processing unit responding to the switching of the mode selection switch from the first photographing mode to a second photographing mode by clearing the photometric information which had been stored during the first photographing mode, and then performing an arithmetic operation to determine an exposure period during the second photographing mode.

2. An automatic exposure controller according to claim 1 in which the photometry circuit includes an average photometry circuit and a spotwise photometry circuit, the central processing unit selecting whether the output from the average photometry circuit and/or the output of the spotwise photometry circuit is applied as an input to the A/D converter as a function of the position of the mode selection switch.

3. An automatic exposure controller according to claim 1 in which the A/D converter is of a sequential comparison type and comprises the central processing unit, a D/A converter for converting a digital output from the central processing unit into a corresponding analog value, and a comparator for comparing the output from the D/A converter against the output from the photometry circuit.

4. An automatic exposure controller according to claim 1 in which the first photographing mode is a spotwise photometry photographing mode, and when the mode selection switch has selected the spotwise photometry mode, the central processing unit stores the photometric value from the photometry circuit N times, N being an integer greater than zero, and calculates an average value of the added photometric values, thus determining an exposure period to be used during the spotwise photometry on the basis of the average value.

* * * * *